No. 754,549. PATENTED MAR. 15, 1904.
C. F. DIETZ.
CREAM ROLL FORMING MACHINE.
APPLICATION FILED JAN. 18, 1904.
NO MODEL.
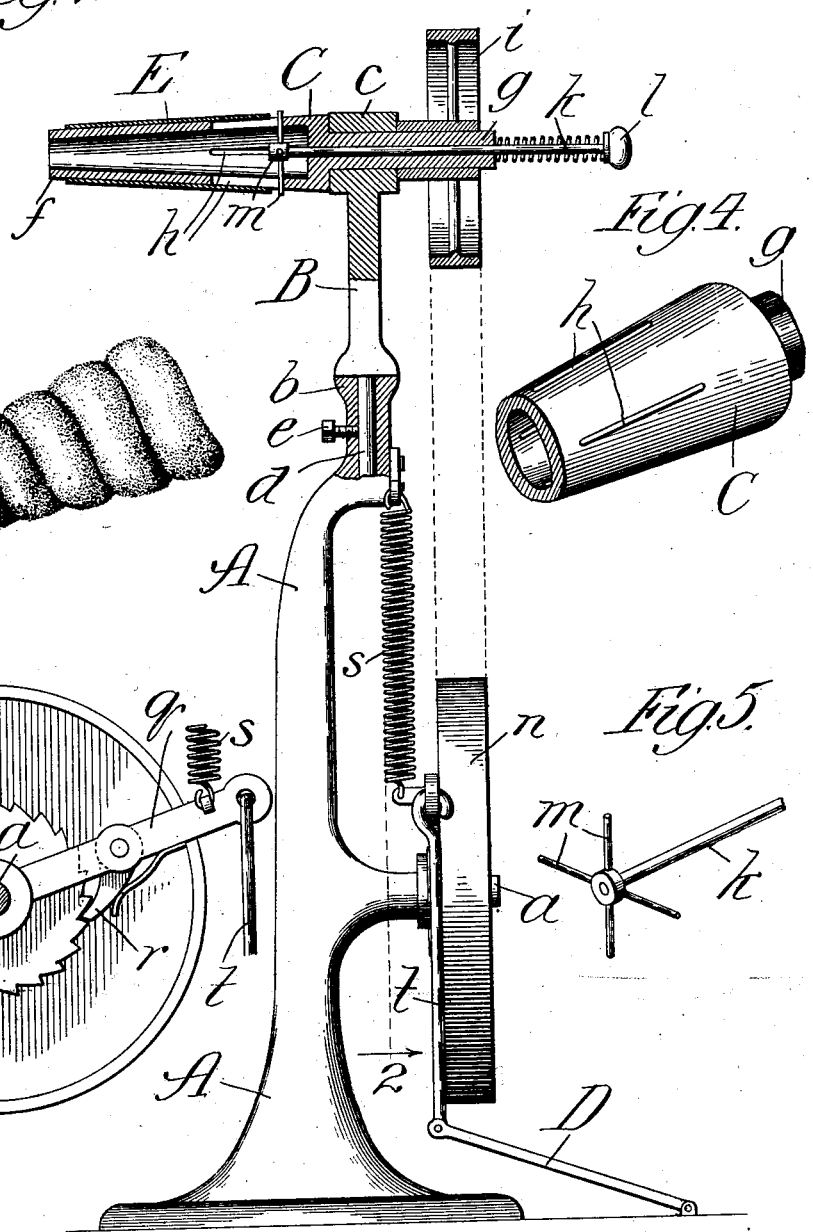
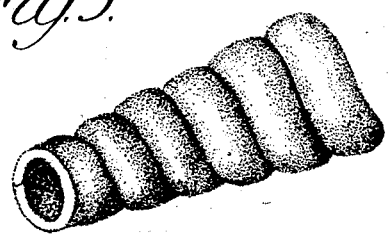
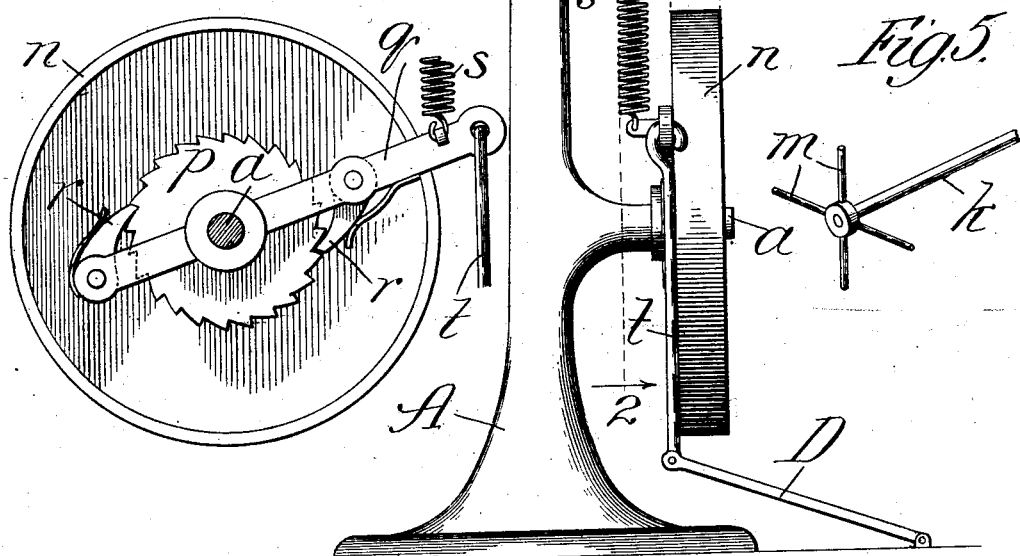
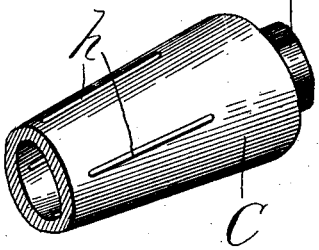
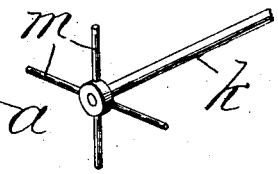
Witnesses:
Inventor:
Christian F. Dietz.
By Dyrenforth, Dyrenforth & Lee,
Attys.
THE NORRIS PETERS CO., PHOTO-LITHO., WASHINGTON, D. C.

No. 754,549. Patented March 15, 1904.

UNITED STATES PATENT OFFICE.

CHRISTIAN F. DIETZ, OF CHICAGO, ILLINOIS, ASSIGNOR OF TWO-THIRDS TO AUGUST JUNGE, OF CHICAGO, ILLINOIS, AND PHILLIP F. CARROLL, OF JOLIET, ILLINOIS.

CREAM-ROLL-FORMING MACHINE.

SPECIFICATION forming part of Letters Patent No. 754,549, dated March 15, 1904.

Application filed January 18, 1904. Serial No. 189,499. (No model.)

*To all whom it may concern:*

Be it known that I, CHRISTIAN F. DIETZ, a citizen of the United States, residing at Chicago, in the county of Cook and State of Illinois, have invented a new and useful Improvement in Cream-Roll-Forming Machines, of which the following is a specification.

My invention relates to an improved machine for use in forming the crust portion in what is known in the baking art as "cream-rolls." This roll is a well-known bakery product, consisting of a spiral crust, usually of slightly-tapering shape, and filled with cream or the like. In the production of the crust portion of the roll a narrow strip of dough is wound spirally upon a hollow tin form and baked thereon, the tin form being frusto-conical to facilitate removal therefrom of the baked crust, which is afterward filled, as stated. It has been usual hitherto to wind the dough upon the tin altogether by hand, an operation necessarily slow and laborious, and as many of the large bakeries turn out thousands of such cream-rolls each night necessarily skilled labor required for forming them altogether by hand has rendered the product comparatively expensive.

My object is to provide a machine of simple and improved construction by the use of which the production of cream-roll crusts as described may be greatly facilitated.

Referring to the drawings, Figure 1 is a partly-sectional elevation of my improved machine; Fig. 2, a broken section taken on line 2 in Fig. 1; Fig. 3, an enlarged perspective view of a finished crust; Fig. 4, an enlarged broken perspective view of a tapering mandrel for holding the tins during the operation of winding the dough thereon, and Fig. 5 an enlarged broken perspective view of ejector mechanism.

A is a standard formed at one side with a stub-shaft $a$. At the top of the standard is a vertical sleeve portion $b$, adapted to receive and hold a vertical arm B, provided in its upper end with a horizontally-disposed bearing-sleeve $c$. The arm B has a reduced downward-extending part $d$, fitting an opening through the sleeve $b$ and removably fastened in place by means of a set-screw $e$.

C is a mandrel having a hollow tapering head portion $f$ and shank or shaft portion $g$. In the head portion $f$ are longitudinal-extending slots $h$, disposed as indicated in Fig. 4. The shaft portion $g$ of the mandrel is journaled in a bearing $c$ and beyond said bearing carries a pulley $i$. Extending through a central opening in the shaft $g$ is a plunger-rod $k$, provided at its outer end with a knob or handle $l$ and at its inner end with radially-extending pins or fingers $m$, passing through the slots $h$ and projecting slightly beyond the surface of the mandrel.

Journaled upon the shaft $a$, directly beneath the pulley $i$, is a pulley $n$, belted to the pulley $i$. On the hub portion of the pulley $n$ is a ratchet-wheel $p$. Fulcrumed upon the shaft $a$ is a lever $q$, carrying spring-pawls $r\ r$, engaging the ratchet $p$. A spring $s$, connected at its upper end with the sleeve portion of the standard A and at its lower end with the free end portion of the lever, tends normally to hold the latter in the raised position. (Shown in Fig. 2.) D is a treadle connected by the rod or link $t$ with the outer end of the lever $q$.

An operator stands at the side of the machine, to the right in Fig. 1, with his foot upon the treadle D and his chest at or adjacent to the knob $l$. As many tins E of frusto-conical shape are provided as may be required for the number of cream-rolls that are to be made. These tins are all of a size and adapted to be slipped upon the mandrel C, as indicated. The operator places a tin E upon the mandrel and operates the treadle D, which through the lever $q$ and pawl-and-ratchet mechanism described rotates the pulley $n$ and through the latter the pulley $i$, mandrel C, and tin upon the mandrel. While the tin is rotating the operator presses one end of a narrow strip of dough upon one end thereof and guides it, whereby it is wound spirally upon the tin to the opposite end of the latter, where it is broken off. The operator then presses the knob $l$ with his chest, causing the plunger $k$ to move inward and the pins $m$ to engage the tin or form E and slide it from the mandrel, so that it may be readily removed and placed to one side ready for baking. This operation is repeated for each cream-roll crust that is to be formed. It requires but little skill to form the spiral crust in this manner, and by the use of my improved machine one operator is able to do more and better work than several could by the old method in the same time.

The machine is of simple and inexpensive construction, and while I prefer to provide it throughout as shown and described it may be variously modified in the matter of details of construction without departing from the spirit of my invention as defined by the claims.

What I claim as new, and desire to secure by Letters Patent, is—

1. In a machine for forming crusts, of the character described, a support, a mandrel journaled in the support, and adapted to receive and hold the hollow baking-form, and means for rotating the mandrel, substantially as described and for the purpose set forth.

2. In a machine for forming crusts, of the character described, a support, a mandrel journaled in the support, and adapted to receive and hold the hollow baking-forms, means for rotating the mandrel, and a form-engaging ejector movable along the mandrel, substantially as and for the purpose set forth.

3. In a machine for forming crusts, of the character described, the combination of a support, a hollow tapering mandrel, journaled in the support, provided with an elongated slot and adapted to receive and frictionally hold the hollow tapering baking-forms, means for rotating the mandrel, a plunger movable within and extending beyond one end of the mandrel and a form-ejector pin on the plunger extending through said slot, substantially as and for the purpose set forth.

4. In a machine for forming crusts, of the character described, a support, a mandrel journaled in the support and adapted to receive and hold the hollow baking-forms, a pulley upon the mandrel, a driving-pulley, journaled on the support, and belted to the pulley on the mandrel, a ratchet-wheel on the driving-pulley, a treadle, and pawl-and-ratchet-actuating means between said treadle and driving-pulley, substantially as and for the purpose set forth.

5. In a machine for forming crusts, of the character described, a support, a hollow tapering mandrel journaled in the support and adapted along its forward end portion to receive and hold the hollow tapering baking-forms, and provided with a longitudinally-extending slot, a spring-returned plunger extending into the mandrel, from the rear end thereof, having a form-ejector pin extending through said slot at one end and in position, at its opposite end, to be pressed by the chest of the operator, and means for rotating the mandrel, substantially as and for the purpose set forth.

CHRISTIAN F. DIETZ.

In presence of—
N. M. GODDARD,
WALTER N. WINBERG.